INVENTORS
RICHARD BOGHOLTZ, JR.
HERBERT DYM

BY *Robert E. Jandt*

ATTORNEY

United States Patent Office 3,452,205
Patented June 24, 1969

3,452,205
DEFECT DETECTING SCANNER WITH OUTPUT ANALYZED IN THE FREQUENCY DOMAIN
Richard Bogholtz, Jr., and Herbert Dym, Mahopac, N.Y., assignors to International Business Machines Corporation, Armonk, N.Y., a corporation of New York
Filed Jan. 13, 1967, Ser. No. 609,143
Int. Cl. H01j *39/12*
U.S. Cl. 250—211     7 Claims

ABSTRACT OF THE DISCLOSURE

The disclosed apparatus employs a repetitively operated solid state photosensitive device which yields a time variant waveform manifestive of the intensity distribution of light incident upon the device, to detect minute changes in the pattern of illumination, by detecting changes in the frequency spectrum of the output waveform. This it achieves through at least three narrow bandpass filters which pass the fundamental and at least two integral harmonic frequencies to produce signals for a comparator which compares the filter outputs in all combinations of pairs. The strengths of the filtered signals are initially adjusted for esual signal strength for an illumination pattern against which subsequent patterns are compared.

BACKGROUND OF THE INVENTION

Field of the invention

This invention relates to an apparatus for analyzing the spectral distribution of a repetitive waveform, and more particularly to an apparatus for detecting minute changes in the illumination distribution on a solid state photosensitive device by analyzing the spectral content of the output waveform therefrom.

DESCRIPTION OF THE PRIOR ART

The photosensitive device employed as part of the instant invention is disclosed and claimed in the copending application of J. W. Horton et al., Ser. No. 279,531, filed May 10, 1963 and assigned to the same assignee as this application. In that former application the spatial distribution of the incident light was obtained by applying a ramp voltage to the device and differentiating the output on the common bus. The output waveform represented the illumination distribution on the device as a function of time, since the applied ramp voltage caused the localized response of the device to light to move, or scan, across the device. This time domain mode of operation is useful when the spatial distribution of the light is desired.

A very marked increase in the sensitivity of the photosensitive device to changes in the illumination pattern is achieved with the instant invention by repetitively applying the scanning ramp voltage to the photosensitive device from. This frequency domain analysis provides a very and analyzing the spectrum of the waveform output there sensitive detection of even minute shadow patterns on the device which are invisible to the human eye. The frequency analysis also permits the sensitivity of other time domain phenomena detection to be markedly increased.

It is therefore an object of this invention to provide an apparatus for detecting changes in a physical phenomenon, whose characteristics are manifested by a waveform spectrum, by detecting changes in the frequency distribution within the waveform.

A further object is to provide an apparatus for detecting changes in the intensity distribution of light incident upon a scanning type of photosensitive device by operating the scanner repetitively and detecting changes in the spectral distribution of the output waveform therefrom.

The foregoing and other objects, features and advantages of the invention will be apparent from the following more particular description of preferred embodiments of the invention, as illustrated in the accompanying drawings.

Figure 1:
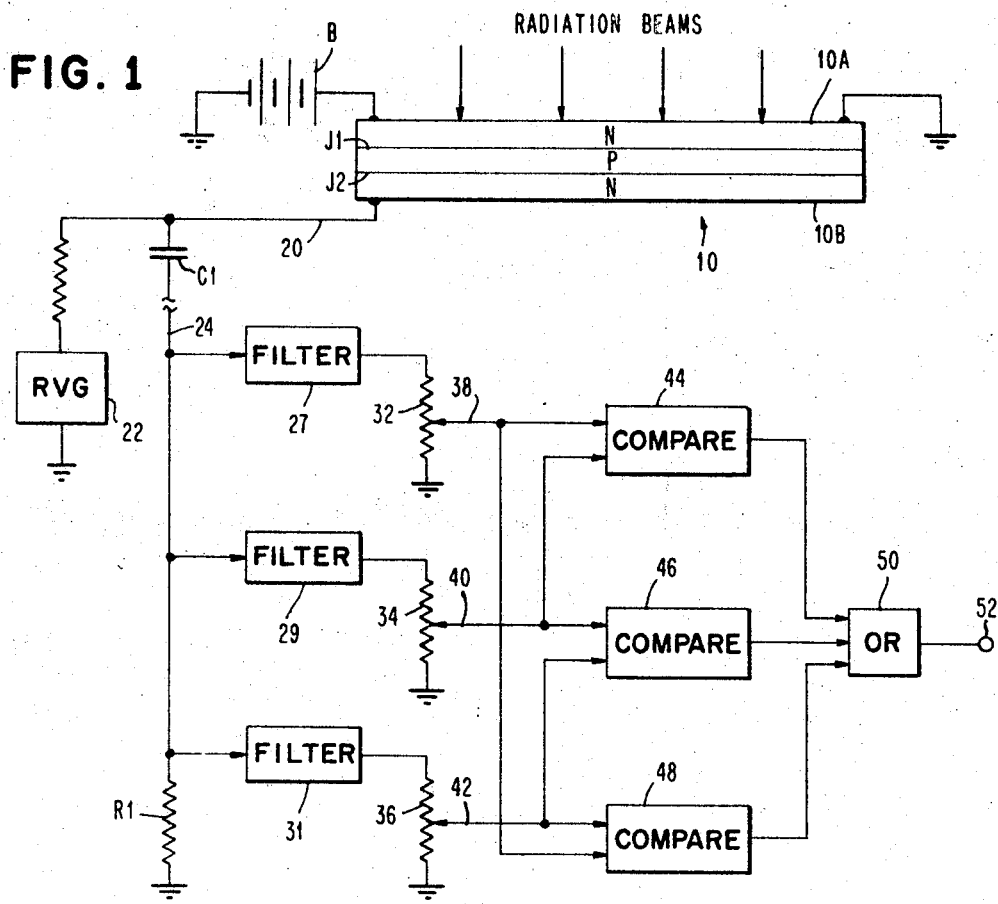
Figure 3:
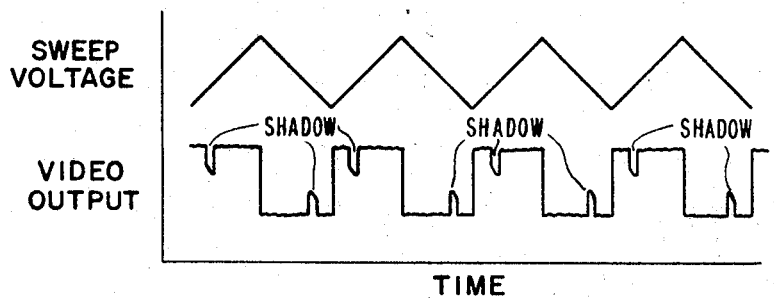
Figure 2:
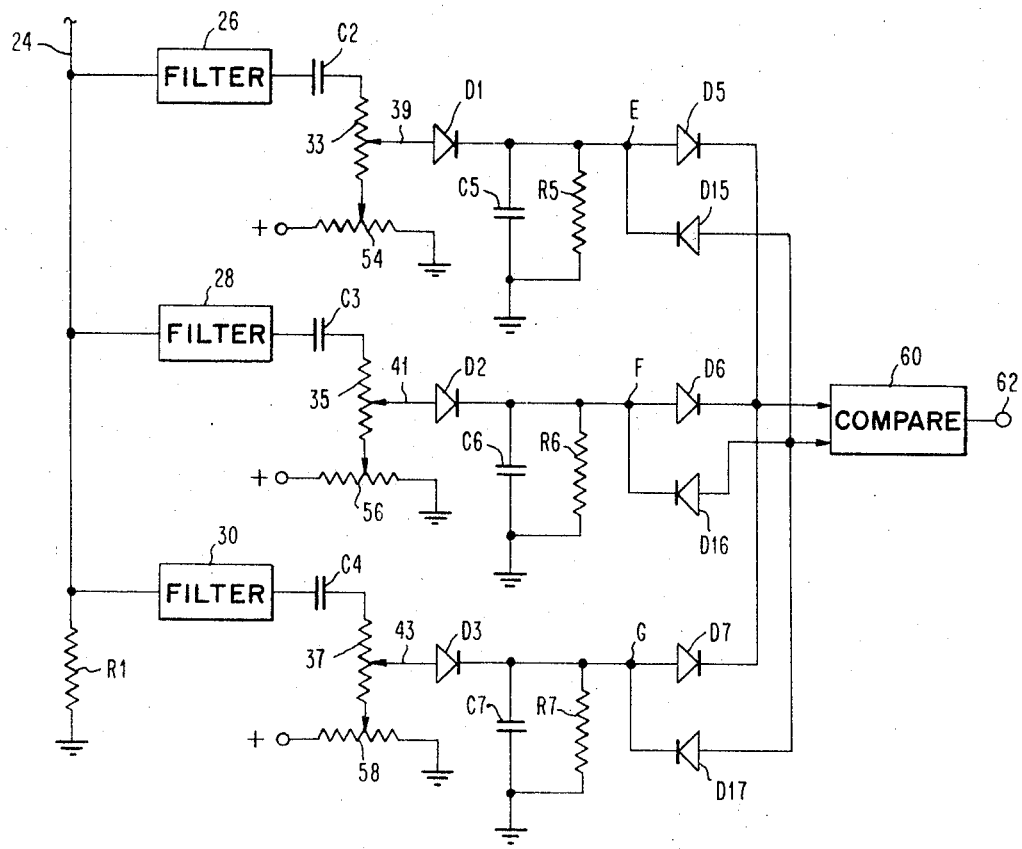
Figure 4:
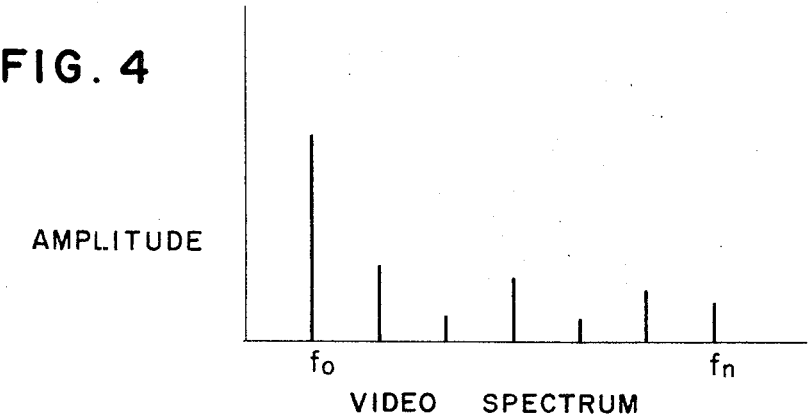

In the drawings:
FIG. 1 shows a schematic embodiment which best illustrates the principle of the invention.
FIG. 2 shows an operational schematic of a preferred construction.
FIG. 3 shows typical waveforms inherent in the operation of the invention.
FIG. 4 shows the spectral distribution of a typical waveform.

DESCRIPTION OF THE PREFERRED EMBODIMENTS

In FIG. 1 the photosensitive device 10 is one such as that disclosed in the copending application of Horton and Lynch, Ser. No. 279,531, filed May 10, 1963, having a common assignee with the instant application. The photosensitive device consists basically of three layers of semiconductive material of alternating conductivity type to provide two assymmetrically conductive junctions in opposed relationship. The uppermost layer 10A is resistive and has a potential gradient established longitudinally thereof by the connection of the battery B and ground to the ends of the layer. The upper junction $J_1$ is photosensitive while the lower junction $J_2$ provides a simple diode action. The lowermost layer 10B is uniformly potentialized from line 20. The device 10 thus consists in essence of an infinite number of pairs of devices consisting of a photodiode and a blocking diode connected in opposition to one another.

Each of the photodiodes is in essence connected to a different potential level by virtue of its position in the resistive layer 10A and the battery potential applied thereto. Each of the blocking diodes has a common connection to the bus layer 10B. With the line 20 initially potentialized so as to back-bias all of the blocking diodes, there will be no conduction through the device. As the potential of line 20 decreases (or increases, depending on the conductivity types of the materials employed), each incremental blocking diode becomes forward biased to allow an additional current flow through the device proportional to the photo induced current through the bus activated photosensitive junction. In the total absence of light the current flow will be the summation of all of the dark currents of the incremental photodiodes aligned with the forward biased blocking diodes. In the presence of a light pattern each incremental photodiode will respond with a current proportional to the incident light. All of the incremental currents add to produce a common current in the line 20. Thus, as the ramp voltage generator 22 applies an increasing voltage to the photosensitive device 10, it responds as if a window shade were opened over the device to provide a response in the line 20 which is a time function of the incident radiation exposed by the opening of the shade. If the device were uniformly illuminated the current in line 20 would become a linear function of time. For discrete beams of light such as that shown in FIG. 1, the current response in line 20 would be a step function with four sharp vertical excursions at those times during the sweep when the incremental blocking diode portions opposite the beams become forwardly biased.

Since the response on line 20 is the summation of the photocurrents in the activated region of the device, it is conventional to differentiate the response of line 20 to yield a succession of incremental responses proportional to the incident light. To this end the capacitor $C_1$ and resistor $R_1$ provide the requisite differentiation function. Thus, the line 24, for the illustrated pattern of illumination would yield four discrete pulses separated in time, as the ramp voltage generator sweeps the device 10. This in effect produces in line 24 a succession of responses at the edge of the window shade as it is drawn across the device. Thus mode of operation produces a time variant waveform on line 24 which is a manifestation of the spatial distribution of the incident radiation.

If as in the practice of the instant invention it is desirable to increase the sensitivity of the device 10 to changes in the illumination pattern incident thereon relative to a reference pattern of illumination, the additional circuitry shown schematically to the right of the line 24 is employed, together with a repetitive operation of the ramp voltage generator 22 with a triangular waveform (as shown in FIG. 3) having a basic frequency $F_0$. This produces on line 24 a differentiated response (as shown in FIG. 3) which is subjected to the processing now to be described.

The differentiated video response on line 24 is applied in parallel to the three narrow bandpass filters 27, 29 and 31, each of which is tuned to pass a different narrow band of frequencies and to produce a D.C. signal level proportional to the amplitude of the filtered waveform. Preferably, these filters process the fundamental frequency in filter 27, the second harmonic in filter 29, and the fourth harmonic in 31. The filters 27, 29, and 31 include the rectify elements shown in greater detail in FIG. 2, the circuit of FIG. 1 being highly schematic to illustrate the principle of the invention. The filter outputs (D.C. signal levels) are applied respectively to the variable normalizing potentiometers 32, 34 and 36. These potentiometers are initially adjusted manually so that the filtered waveform outputs therefrom are equal in amplitude when the device 10 is illuminated with the reference pattern of illumination, against which all subsequent patterns are to be compared to detect a change.

In a typical application the reference pattern would be a uniform illumination of the device 10, and the detected change would be a shadow cast on the device. It has been found, for example, that when the device 10 was illuminated with poorly columnated light, a 5 mil wire held one inch from the surface of the device 10 would cast a shadow that could be detected. This shadow was invisible to the eye and could not be detected by visual examination of an oscilloscope display of the time variant waveform activated from the line 24.

To detect changes from the reference pattern of illumination the normalized waveforms from the potentiometers 32, 34 and 36 are connected via lines 38, 40 and 42 to the comparators 44, 46 and 48 in all combinations of pairs. Thus for the three lines there are three unique pairs. This is implemented in FIG. 1 by providing as inputs to comparator 44 lines 38 and 40, to comparator 46 lines 40 and 42, and to comparator 48 lines 38 and 42. If five filters were employed, then the number of comparators would be ten. The number of comparisons, $N_C$, for any number of harmonics, $N_H$ is $$N_C = \tfrac{1}{2}(N_H^2 - N_H)$$

which formula is that for the number of pairs which may be constructed from N items.

Each of the comparators 44, 46, and 48 compares the relative magnitude of the D.C. voltages on the connecter pairs of the lines 38, 40, and 42 and yields an output when the voltages are unequal. Since the levels were initially adjusted to be equal for the reference pattern of illumination, none of the comparators 44, 46 and 48 will yield an output. When, however, a change in the illumination occurs the spectrum of the waveform on line 24 will also change. This results in a change in the relative magnitude of at least one pair of the filtered waveforms (and the corresponding D.C. signal level) to produce an output from one of the comparators 44, 46 or 48. The output response is detected in the OR gate 50 and manifested as a change in voltage level on the output hub 52.

From the foregoing explanation it will be appreciated that the number of comparators increases rapidly as the number of filters increases. The overall sensitivity of the detection increases with the number of filters used, three being a practical minimum. Also as the number of comparators increases the difficulties of individually adjusting the thresholds of the various comparators to a uniform response increases.

Before describing a more practical implementation of this invention, it is well to digress briefly and examine some of the factors which contribute to the sensitivity of this apparatus. From this it will become more apparent how the principles of the invention may be extrapolated to other applications. Referring now to FIG. 3, the first waveform represents the triangular scanning voltage which is applied by the ramp voltage generator 22 to the device 10 via the line 20. This, as stated, is repeated at the basic frequency $F_0$. The device 10 responds, after differentiation, with a waveform such as that shown in the second line of FIG. 3. The basic square waveform has the fundamental frequency of the triangular scanning voltage, upon which is superimposed the response of the device 10 to the scanning potential and the incident radiation. The ripples in this second waveform occur because of discontinuities in the device structure, except for the one labeled "shadow." This perturbation in the waveform has been exaggerated for emphasis, when in actuality it would be barely, if at all, perceptible. So long as the illumination pattern is invariant the frequency distribution of the waveform spectrum will remain constant, having a distribution much like that shown in the FIG. 4 where the relative amplitudes of the fundamental and several harmonic frequencies is shown by the relative heights of the various lines at the corresponding frequencies. It will be noted that the amplitudes of these harmonics are not uniform. When however, the potentiometers 32, 34 and 36 (FIG. 1) are properly adjusted the signal voltages of the frequencies employed will be adjusted to a common level. When the illumination pattern is changed, the relative magnitudes of the spectral components will also change. Thus, by comparing the relative strengths among all pairs of the filtered (and rectifierd) signals, at least one pair will yield a change. A uniform increase or decrease in the overall level of illumination produces no change in the relative amplitudes of the various harmonics, merely a proportionate change in all.

The choice of the harmonics for comparison should be such as to maximize, or at least insure that there is an amplitude difference between at least one pair of filtered signals for all shadow positions. The more harmonics that are compared the greater is the likelihood that this condition will be met. There is, however, a compromise that must be made with the increase in complexity of the apparatus. Examination of a plot of the harmonic amplitudes as a function of shadow position has yielded a general trend. Although these waveshapes may vary with non-uniformities of the solid state scanning device itself and transients in the circuitry, there is a general sinusoidal shape. The frequency of these sinusoids 's proportional to the frequency of its corresponding harmonic. That is, the fundamental looks like a half cycle, the second harmonic looks like a full cycle and so on. The fundamental is the only component that does not go to zero amplitude for some shadow position. The change in amplitude of all even harmonics goes to zero when the shadow occupies a central position of the scanning device. The choice of harmonics, therefore, must include at least one odd harmonic. The choice of the fundamental, together with the second and fourth harmonics is a good one.

While the circuit of FIG. 1 shows a separate comparator for each comparison to be made, it is possible to simplify the circuit while achieving the same functional utility. If the number of harmonics to be compared is increased, the hardware economy effected by the structure of FIG. 2 becomes marked.

In FIG. 2, as in FIG. 1, the differentiated response of the device 10 appears on line 24 which is applied in parallel to the filters 26, 28 and 30. The sinsoidal outputs from the filters are capacitively coupled via $C_2$, $C_3$ and $C_4$ to the diodes $D_1$, $D_2$ and $D_3$ respectively through the media of the normalizing potentiometers 33, 35, 37 and the level setting potentiometers 54, 56 and 58, these latter being necessary for reasons to be explained. The signals appearing on lines 39, 41 and 43, are A.C. waveforms having the frequency of the bandpass of the corresponding filters. These waveforms are identical to those passed by filters 27, 29 and 31 in FIG. 1 before rectification and smoothing therein.

The diodes $D_1$, $D_2$ and $D_3$ rectify the sinusoidal output from the corresponding filters and yield direct current potentials proportional to the amplitude of the respective sine waves. The capacitor and shunt resistor pairs $C_5R_5$, $C_6R_6$ and $C_7R_7$ act as smoothing filters for the rectified outputs of the diodes conected thereto. Each of these filtered D.C. potentials is applied to pairs of oppositely poled diodes $D_5D_{15}$; $D_6D_{16}$; and $D_7D_{17}$. These diodes act as a positive and negative analog OR, in that the output of the positively conected diodes $D_5$, $D_6$ and $D_7$, which are commonly connected to one input of the comparator 60 is equal to the highest D.C. potential, while the negatively connected diodes $D_{15}$, $D_{16}$ and $D_{17}$, which are commonly connected to the second input of the comparator 60, have an output equal to the lowest D.C. potential. Comparator 60 detects the difference between the highest and lowest filtered D.C. potentials and registers on output hub 62 whenever the difference exceeds the threshold of the device. This threshold is related to the setting of the level potentiometers 54, 56 and 58, which are adjusted to equalize the base reference levels upon which the harmonic responses are superimposed. This base level adjustment was found necessary to balance differences in the operating levels of the various circuit components.

When the apparatus in FIG. 2 is properly adjusted for the initial conditions of illumination, so as to yield no output from the comparator 60, any minute changes in the illumination density distribution on the device 10 will be detected and produce an output on hub 62. Overall changes in the level of illumination, however, will only change the strengths of all harmonics proportionally, but will not change their relative strengths. Thus, no output will be produced on hub 62 for change in the gross level of illumination.

While the invention has been described with respect to a specific phenomenon transducer, namely a photosensitive device, it is obvious that any repetitive waveform having similar characteristic to that produced by the described transducer can be similarly analyzed. The invention resides in the apparatus for analyzing the waveform independent of the transducer. A repetitive radar signal could for example, be normalized for a stable search condition and subjected to the same processing to detect a change in the return as a sensitive altering system. While it would not yield any spatially oriented data, it would provide a simple sensitive apparatus for detecting a change in the pattern.

While the invention has been particularly shown and described with reference to preferred embodiment thereof, it will be understood by those skilled in the art that various changes in form and details may be made therein without departing from the spirit and scope of the invention.

What is claimed is:

1. Apparatus for detecting a change in a physical phenomenon whose characteristics are manifested by a waveform spectrum by detecting changes in the frequency distribution of the waveform spectrum, comprising:
    (a) means for repetitively producing the waveform manifesting the characteristics of the phenomenon, said waveform including a plurality of harmonic frequencies;
    (b) a plurality of filters commonly connected to receive as an input thereto the said waveform, and each operative to pass a different predetermined band of frequencies within the spectrum of the waveform and to yield an output manifestive of the strength of its associated filtered spectral component;
    (c) means for adjusting the strengths of each of the outputs of said filters to a common signal strength in response to the plurality of harmonic frequencies of a base waveform manifesting a stable condition of the physical phenomenon;
    (d) and means operative to compare the relative signal strengths of the outputs of said filters in all possible pairs of combinations thereof and yielding an output when at least one pair of signals undergoes a change in relative strength, whereby a change in the harmonic spectrum of the waveform is detected to manifest a change in the physical phenomenon.

2. The apparatus of claim 1 wherein at least three filters are provided, one of which passes the fundamental repetition frequency of the waveform, and the remaining ones of which filters pass respective integral harmonics of the fundamental frequency.

3. The apparatus of claim 1 wherein the means for repetitively producing the waveform comprises a light sensitive device operable in response to repetitively applied ramp voltage to produce a time variant waveform manifestive of the spatial distribution of light energy incident upon the device.

4. Apparatus for detecting minute changes in a pattern of illumination comprising:
    (a) a photosensitive device operative in response to an applied scanning voltage to yield an electrical waveform manifestive of the spatial distribution of the light intensity pattern incident thereon;
    (b) means for repetitively applying a scanning voltage to said photosensitive device to produce a time-variant waveform including a plurality of harmonic frequencies as an output therefrom wherein said harmonic frequencies manifest the spatial distribution of the light incident thereon;
    (c) a plurality of bandpass filters connected to receive said time variant waveform and to pass a different band of frequencies within the spectrum;
    (d) means for normalizing the outputs from said filters to a common equal signal level in the presence of a plurality of harmonic frequencies of a standard reference pattern of illumination on said device;
    (e) means for comparing the outputs of said filters in all different paired combinations thereof and producing an output when at least one pair of filtered signals have unlike signal strengths, whereby a change in the pattern of illumination will be detected.

5. The apparatus of claim 4 wherein there are provided at least three filters respectively operative to pass a band of frequencies including the fundamental frequency, the second harmonic frequency, thereof, and the forth harmonic frequency thereof.

6. The apparatus of claim 4 wherein the means for normalizing the filter outputs to a common signal level comprises a potentiometer connected to the output of each filter to adjustably attenuate the signal strengths to a common amplitude.

7. Apparatus for detecting minute changes in the intensity distribution of a radiant light pattern comprising:
    (a) a photosensitive device operative in response to an applied scanning voltage to yield a time-variant electrical waveform whose successive instantaneous amplitudes measure the intensity of the radiation incident on the device at successive corresponding spatial positions thereon;

(b) means for repetitively applying a scanning voltage to said device to cause it to cyclically respond to the incident radiation at a given fundamental frequency, to yield a time variant waveform whose spectrum of frequencies manifests the light pattern;
(c) at least three narrow bandpass filters connected to receive the waveform output from said device and each operative to pass a different narrow band of frequencies within the spectrum including the fundamental, and at least one even harmonic thereof;
(d) means for capacitively coupling the output from each of said filters to a potentiometer for individually adjusting the signal level therefrom to a common amplitude in the presence of a given reference light pattern;
(e) a diode connected to each of said potentiometers for rectifying the respective filtered output signals and yielding a direct current potential proportional to the amplitude thereof;
(f) a smoothing filter connected to the outputs of each of said rectifying diodes;
(g) a pair of oppositely poled diodes connected to the outputs of each of said smoothing filters;
(h) means commonly connecting like-poled diodes of said pairs of diodes to two respective input connections of a voltage detecting device, operative responsive to a difference in the input potentials thereto to yield an output response, which output response will manifest a change in the light intensity distribution upon said device.

References Cited
UNITED STATES PATENTS 3,215,934 11/1965 Sallen _____ 324—77
3,317,733 5/1967 Horton et al. _____ 250—211

RALPH G. NILSON, *Primary Examiner.*

MARTIN ABRAMSON, *Assistant Examiner.*

U.S. Cl. X.R.

250—214, 219, 221; 324—77